(12) United States Patent
Hasunuma et al.

(10) Patent No.: US 12,036,675 B2
(45) Date of Patent: Jul. 16, 2024

(54) ROBOT CONTROL DEVICE, ROBOT SYSTEM, AND ROBOT CONTROL METHOD

(71) Applicant: KAWASAKI JUKOGYO KABUSHIKI KAISHA, Kobe (JP)

(72) Inventors: Hitoshi Hasunuma, Kobe (JP); Takeshi Yamamoto, Kobe (JP); Kazuki Kurashima, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 457 days.

(21) Appl. No.: 17/418,997

(22) PCT Filed: Dec. 27, 2019

(86) PCT No.: PCT/JP2019/051530
§ 371 (c)(1),
(2) Date: Jun. 28, 2021

(87) PCT Pub. No.: WO2020/138461
PCT Pub. Date: Jul. 2, 2020

(65) Prior Publication Data
US 2022/0088775 A1 Mar. 24, 2022

(30) Foreign Application Priority Data
Dec. 27, 2018 (JP) ................. 2018-245470

(51) Int. Cl.
*B25J 9/16* (2006.01)
*B25J 13/00* (2006.01)

(52) U.S. Cl.
CPC ............ *B25J 9/163* (2013.01); *B25J 13/00* (2013.01); *G05B 2219/33034* (2013.01); *G05B 2219/39001* (2013.01)

(58) Field of Classification Search
CPC . B25J 9/163; B25J 13/00; G05B 2219/33034; G05B 2219/39001
See application file for complete search history.

(56) References Cited

U.S. PATENT DOCUMENTS 8,958,912 B2 * 2/2015 Blumberg .............. B25J 9/1682
700/259
9,977,965 B1 * 5/2018 Parikh .................... B25J 9/1697
(Continued)

FOREIGN PATENT DOCUMENTS

JP 2017-30135 A 2/2017

OTHER PUBLICATIONS

Polydoros, A.S., Nalpantidis, L. Survey of Model-Based Reinforcement Learning: Applications on Robotics. J Intell Robot Syst 86, 153-173 (2017). https://doi.org/10.1007/s10846-017-0468-y (Year: 2017).*

(Continued)

*Primary Examiner* — Joseph M Rocca
*Assistant Examiner* — Joshua Alexander Garza
(74) *Attorney, Agent, or Firm* — Oliff PLC (57) ABSTRACT

A robot control device includes: a trained model built by being trained on work data; a control data acquisition section which acquires control data of the robot based on data from the trained model; base trained models built for each of a plurality of simple operations by being trained on work data; an operation label storage section which stores operation labels corresponding to the base trained models; a base trained model combination information acquisition section which acquires combination information when the trained model is represented by a combination of a plurality of the base trained models, by acquiring a similarity between the trained model and the respective base trained models; and an information output section which outputs the operation label (Continued)

corresponding to each of the base trained models which represent the trained model.

12 Claims, 7 Drawing Sheets

(56) References Cited

U.S. PATENT DOCUMENTS

| | | | |
|---|---|---|---|
| 10,926,408 B1* | 2/2021 | Vogelsong | B25J 9/163 |
| 11,465,279 B2* | 10/2022 | Holson | G05D 1/0088 |
| 2017/0028551 A1* | 2/2017 | Hemken | B25J 9/163 |
| 2017/0028562 A1 | 2/2017 | Yamazaki et al. | |
| 2019/0047149 A1* | 2/2019 | Wouhaybi | B25J 9/1666 |
| 2019/0291277 A1* | 9/2019 | Oleynik | B25J 9/1669 |

OTHER PUBLICATIONS

Roveda, L., Maskani, J., Franceschi, P. et al. Model-Based Reinforcement Learning Variable Impedance Control for Human-Robot Collaboration. J Intell Robot Syst 100, 417-433 (2020). https://doi.org/10.1007/s10846-020-01183-3 (Year: 2020).*

Mar. 10, 2020 International Search Report issued in International Patent Application No. PCT/JP2019/051530.

Kappler et al., "Data-Driven Online Decision Making for Autonomous Manipulation", Autonomous Motion Department, Computational Learning and Motor Control Lab.

* cited by examiner

ROBOT CONTROL DEVICE, ROBOT SYSTEM, AND ROBOT CONTROL METHOD

TECHNICAL FIELD

The present invention relates mainly to a robot control device for controlling a robot.

BACKGROUND ART

Conventionally, robot control device equipped with a machine learning device capable of constructing a model for a robot's work operation is known. PTL 1 discloses a robot control device of this type.

PTL 1 discloses a robot system equipped with a machine learning device capable of learning, without human intervention, an optimal operation of a robot when retrieving a workpiece placed in a clutter.

CITATION LIST

Patent Literature

PTL 1: Japanese Patent Application Laid-Open No. 2017-30135

SUMMARY OF THE INVENTION

Problems to be Solved by the Invention

However, the configuration of the above PTL 1 did not allow a user to confirm what kind of operation the trained model has been trained for the robot to perform a series of operations, even after building a trained model for the robot's operation. Therefore, it is difficult for the user to be convinced that the output of the trained model is used for an autonomous operation of the robot, and there is room for improvement in this respect.

The present invention was made in consideration of the above circumstances, and its object is to provide a robot control device, etc., which can easily convince a user of the operation of a robot based on a prediction of a trained model.

Means for Solving the Problems

The problem to be solved by the present invention is as described above, and the means for solving the problem and the effect thereof are described below.

A first aspect of the present invention provides a robot control device configured as follows. That is, the robot control device includes a trained model, a control data acquisition section, base trained models, an operation label storage section, a base trained model combination information acquisition section, and an information output section. The trained model is built by being trained on work data when a human operates a robot so that the robot performs a series of operations. The work data includes input data and output data. The input data is the state of the robot and its surroundings. The output data is the corresponding human operation or the operation of the robot by the human operation. The control data acquisition section acquires control data of the robot to make the robot perform the work. For this acquisition, in the case the input data concerning the state of the robot and its surroundings is input to the trained model, output data concerning the human operation or the operation of the robot predicted accordingly is acquired from the trained model. Each of the base trained models is built by being trained on work data when a human operates the robot so that the robot performs an operation simpler than the series of operations. The base trained model is built for each of the plurality of the operations. The work data includes input data and output data. The input data is the state of the robot and its surroundings. The output data is the corresponding human operation or the operation of the robot by the human operation. The operation label storage section stores operation labels. Each of the operation labels includes information expressing the operation and is stored in correspondence with the base trained model. The base trained model combination information acquisition section acquires combination information when the trained model is represented by a combination of a plurality of the base trained models. The combination information is acquired by acquiring a similarity between the trained model and the respective base trained models. The information output section outputs the operation label corresponding to each of the plurality of the base trained models which are combined to represent the trained model. This output is based on the combination information.

As a result, when the series of operations is trained by the trained model, the user can easily understand based on the operation labels which are output, what combination of operations the series of operations can be said to have been trained as. Therefore, the transparency of the trained model is increased, and the user can use the trained model for robot control with a sense of satisfaction.

A second aspect of the present invention provides a robot control method as follows. That is, in this robot control method, a model built by being trained on work data when a human operates a robot so that the robot performs a series of operations is referred to as a trained model. The work data includes input data and output data. The input data is the state of the robot and its surroundings. The output data is the corresponding human operation or the operation of the robot by the human operation. In this robot control method, models built by being trained on work data when a human operates the robot so that the robot performs an operation simpler than the series of operations are referred to as base trained models. Each of base trained models is built for each of the plurality of the operations. The work data includes input data and output data. The input data is the state of the robot and its surroundings. The output data is the corresponding human operation or the operation of the robot by the operation. This robot control method includes a control data acquisition step, an operation label storage step, a base trained model combination information acquisition step, and an information output step. In the control data acquisition step, control data of the robot to make the robot perform the work is acquired. For this acquisition, in the case the input data concerning the state of the robot and its surroundings is input to the trained model, output data concerning the human operation or the operation of the robot predicted accordingly is acquired from the trained model. In the operation label storage step, operation labels are stored. Each of the operation labels includes information expressing the operation and is stored in correspondence with the base trained model. In the base trained model combination information acquisition step, combination information is acquired when the trained model is represented by a combination of a plurality of the base trained models. The combination information is acquired by acquiring a similarity between the trained model and the respective base trained models. In the information output step, the operation label corresponding to each of the plurality of the base trained models which are combined to represent the trained model is output. This output is based on the combination information.

Effects of the Invention

According to the present invention, a robot control device or the like can be provided in which a user can easily be convinced of a robot operation based on a prediction of the trained model.

EMBODIMENT FOR CARRYING OUT THE INVENTION

Figure 1:
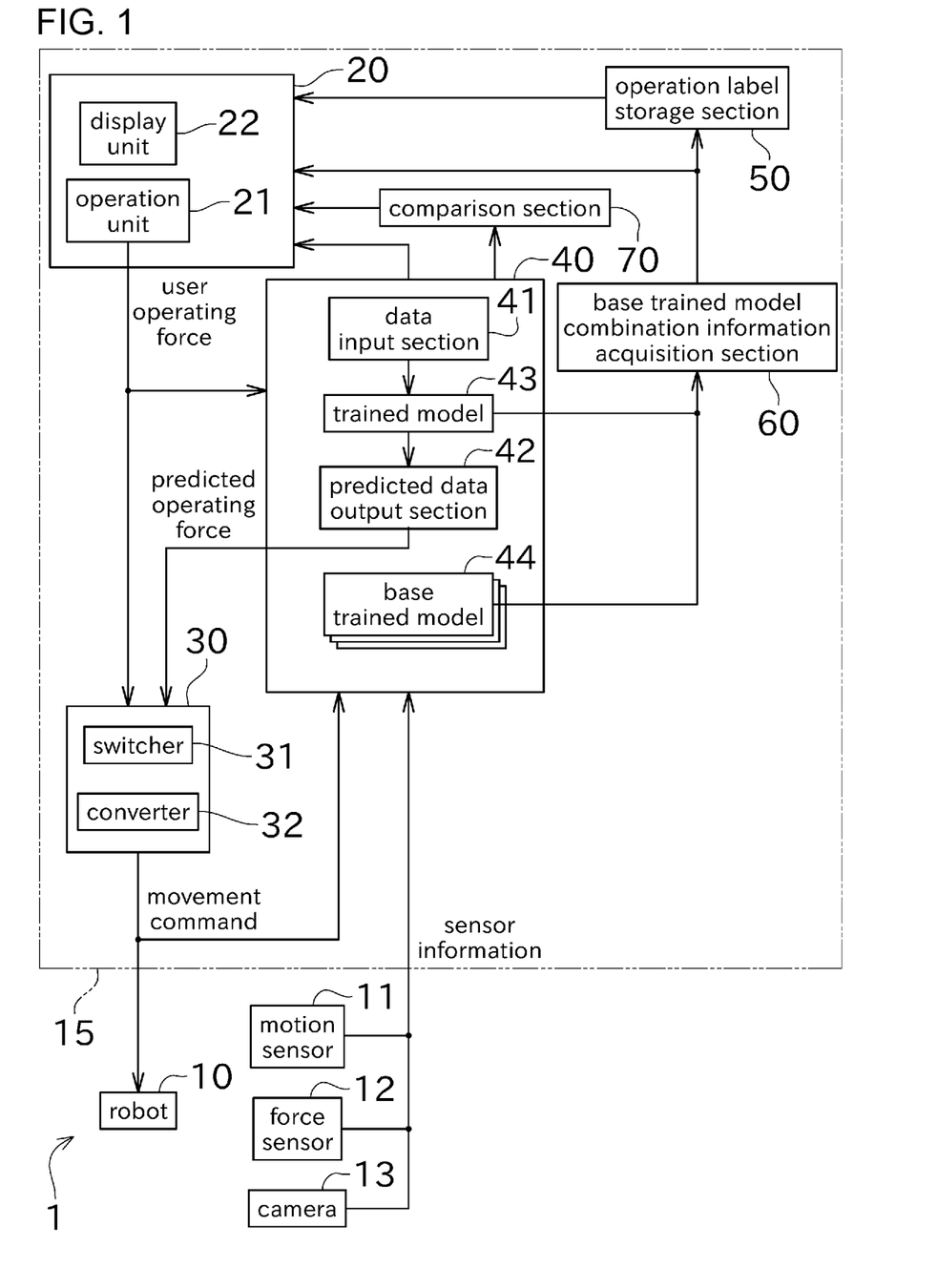
FIG. 1 is a block diagram illustrating an electrical configuration of a robot system according to one embodiment of the present invention.

Next, an embodiment of the present invention will be described with reference to the drawings. FIG. 1 is a block diagram showing the electrical configuration of a robot system 1 according to the embodiment of the present invention.

The robot system 1 shown in FIG. 1 is a system that uses a robot 10 to perform work. The work to be performed by the robot 10 varies, such as assembly, processing, painting, cleaning, and the like.

As will be described in detail below, the robot 10 is controlled using a model (trained model 43) built by machine learning of data. As a result, the robot system 1 can basically perform the work autonomously without the need for user assistance. In addition to performing the work autonomously, the robot 10 can also perform the work in response to an operation by a user. In the following description, the robot 10 performing the work autonomously may be referred to as "autonomous operation" and the robot 10 performing the work in response to the user's operation may be referred to as "manual operation".

As shown in FIG. 1, the robot system 1 includes the robot 10 and a robot control device 15. The robot 10 and the robot control device 15 are connected to each other by wired or wireless means and can exchange signals.

The robot 10 includes an arm unit attached to a pedestal. The arm unit has a plurality of joints, and each joint is provided with an actuator. The robot 10 operates the arm unit by operating the actuators in response to movement commands which are input externally.

An end-effector selected in accordance with the work is attached to the end of the arm unit. The robot 10 can operate the end-effector in response to movement commands which are input externally.

Sensors are attached to the robot 10 for detecting the motion of the robot 10 and the surrounding environment and the like. In the present embodiment, a motion sensor 11, a force sensor 12, and a camera 13 are attached to the robot 10.

The motion sensor 11 is provided at each joint of the arm unit of the robot 10 and detects the rotation angle or angular velocity of each joint. The force sensor 12 detects the force received by the robot 10 during operation of the robot 10. The force sensor 12 may be configured to detect a force applied to the end-effector or to detect a force applied to each joint of the arm unit. The force sensor 12 may also be configured to detect a moment instead of or in addition to the force. The camera 13 detects an image of a workpiece (the progress of work on the workpiece). The workpiece is to be worked on.

The data detected by the motion sensor 11 is motion data that indicates the motion of the robot 10. The data detected by the force sensor 12 and the camera 13 is surrounding environment data indicating the environment around the robot 10. The data that synthesizes the motion data and the surrounding environment data may be referred to as state data in the following description. The state data indicates the state of the robot 10 and its surroundings.

In the following description, the motion sensor 11, the force sensor 12, and the camera 13 provided in the robot 10 may be collectively referred to as the "state detection sensors 11-13". Also, the data detected by the state detection sensors 11-13 may be particularly referred to as "sensor information". Instead of being attached to the robot 10, the state detection sensors 11-13 may be provided around the robot 10.

The robot control device 15 includes a user interface section 20, an operation switching section (control data acquisition section) 30, an AI section 40, an operation label storage section 50, a base trained model combination information acquisition section 60, and a data comparison section (comparison section) 70.

Specifically, the robot control device 15 is a computer including a CPU, a ROM, a RAM, and an HDD. The computer is equipped with a device such as a mouse for the user to operate. It is preferable if the computer includes a GPU, as it enables learning by the neural network described below to be performed in a short time. In the HDD, a program for operating the robot control device 15 is stored. By the cooperation of the above hardware and software, the robot control device 15 can be made to function as the user interface section 20, the operation switching section 30, the AI section 40, the operation label storage section 50, the base trained model combination information acquisition section 60, and the data comparison section 70.

The user interface section 20 realizes a user interface function of the robot control device 15. The user interface section 20 includes an operation unit 21 and a display unit (information output section) 22.

The operation unit 21 is a device used to manually operate the robot 10. The operation unit 21 can be configured to include a lever, a pedal, or the like, for example.

The operation unit 21 includes a known operation force detection sensor, not shown in the figures. The operation force detection sensor detects a force (operating force) applied to the operation unit 21 by the user.

When the operation unit 21 is configured to be moved in various directions, the operating force may be a value including the direction and magnitude of the force, e.g., a vector. The operating force may be detected not only in the form of a force (N) applied by the user but also in the form of an acceleration (i.e., a value obtained by dividing the force applied by the user by the mass of the operation unit 21), which is a value linked to the force.

In the following description, the operating force applied by the user to the operation unit 21 may be particularly referred to as the "user operating force". The user operating force output by the user operating the operation unit 21 is converted into a movement command by the operation switching section 30 as described below.

The display unit 22 can display various information in response to the user's instructions. The display unit 22 can be, for example, a liquid crystal display. The display unit 22 is disposed of in the vicinity of the operation unit 21. If the operation unit 21 is disposed of at a distance from the robot 10, the display unit 22 can display images of the robot 10 and its surroundings.

The robot 10, the operation unit 21, and the AI section 40 are connected to the operation switching section 30. The user operating force output by the operation unit 21 and a predicted operating force described below output by the AI section 40 are input to the operation switching section 30.

The operation switching section 30 outputs a movement command for operating the robot 10 to the robot 10 and the AI section 40. The operation switching section 30 includes a switcher 31 and a converter 32.

The switcher 31 is configured to output one of the input user operating force and the input predicted operating force to the converter 32. The switcher 31 is configured to output the user operating force or the predicted operating force to the converter 32 based on a selection signal indicating which of the user operating force and the predicted operating force is to be converted. The user operates the user interface section 20 as appropriate. As the result, the selection signal is output from the user interface section 20 to the operation switching section 30.

This allows the user to switch between a state in which the robot 10 is operated by the user (manual operation) and a state in which the robot system 1 causes the robot 10 to perform work autonomously (autonomous operation). In the case of manual operation, the robot 10 operates based on the user operating force output by the operation unit 21. In the case of autonomous operation, the robot 10 operates based on the predicted operating force output by the AI section 40.

The selection of which of the user operating force and the predicted operating force is used to operate the robot 10 may be made automatically depending on whether the user is operating the operation unit 21. In this case, the selection is made based on the detection values of the above-described sensors that detect the operation of the operation unit 21. That is, when the user is substantially operating the operation unit 21, the switcher 31 outputs the user operating force to the converter 32. Otherwise, the switcher 31 outputs the predicted operating force to the converter 32.

The converter 32 converts any of the user operating force or the predicted operating force input from the switcher 31 into a movement command for operating the robot 10, and outputs the movement command to the robot 10 and the AI section 40. The movement commands can be rephrased as control data for controlling the robot 10.

The AI section 40 includes the trained model 43 built to make the robot 10 perform a series of operations by autonomous operation. The format of the trained model 43 used in the AI section 40 is arbitrary, and for example, a model using a neural network can be used. The building of the trained model 43 (in particular, the initial building) may be performed in the robot control device 15 or may be performed in another computer.

A data input section 41 functions as an interface on the input side of the AI section 40. Sensor information which is output from state detection sensors 11-13 is input to the data input section 41.

A predicted data output section 42 functions as an interface on the output side of the AI section 40. The predicted data output section 42 can output data based on the model built by the AI section 40 through machine learning.

In the present embodiment, the AI section 40 learns the operations of the robot 10 performed by the user by the operation unit 21 to build the trained model 43. Specifically, the sensor information input from the state detection sensors 11-13 and an operating force obtained by the operation force detection sensor are input to the AI section 40. This operating force corresponds to the user operating force described above.

The user can, for example, make the AI section 40 to build the trained model 43 which is used so that the robot 10 performs a series of operations of inserting a workpiece into an opening of a member.

Specifically, the user operates the operation unit 21 to operate the robot 10, for example, as shown below. That is, the robot 10 is made to pull out a workpiece (pull-out operation). Then, the workpiece is conveyed to a position above the member (conveyance operation). Next, the workpiece is made to be inserted into the opening of the member (insertion operation).

Focusing on the insertion operation of the workpiece, the details of the operation are as follows. That is, (1) the workpiece located above the member is moved downward (i.e., the workpiece is lowered), and the workpiece is brought into contact with the surface of the member. (2) While lightly pressing the workpiece against the surface of the member, the workpiece is moved along the surface of the member to the position of the opening, and the workpiece is positioned inside the opening. (3) With the workpiece positioned inside the opening, the workpiece is lowered.

In the following description, the thing that synthesizes the state of the robot 10 and its surroundings and the user operating force obtained by the user operating the operation unit 21 accordingly, may be referred to as a situation of the robot 10.

The trained model 43 used in the AI section 40 includes a map in a multi-dimensional space. In the training phase, data of a situation of the robot 10 obtained by synthesizing the sensor information and user operating force (situation data) is input to the AI section 40. This set of situation data corresponds to the work data which is the target of machine learning.

Figure 2:
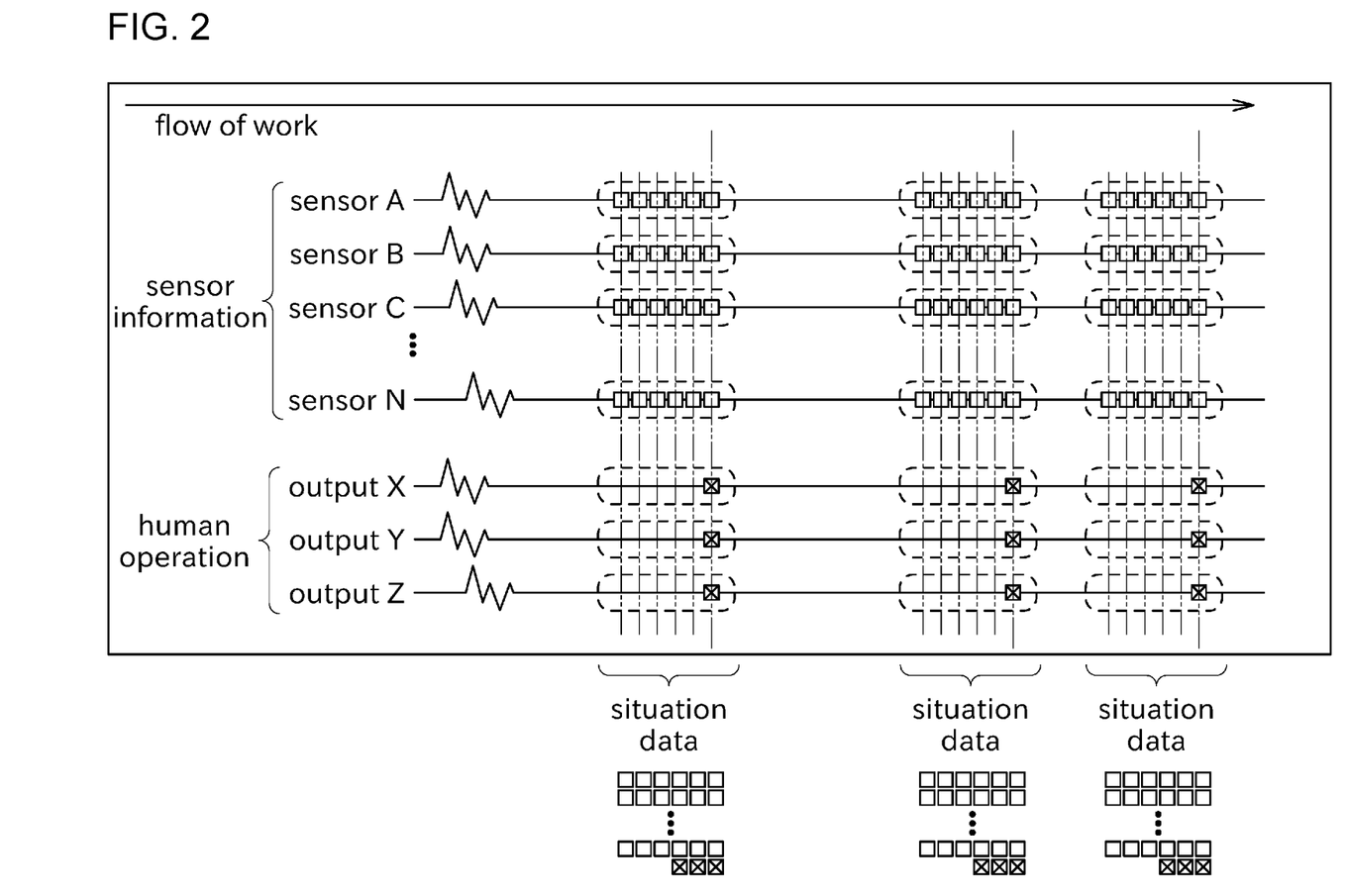
FIG. 2 is a diagram illustrating how time-series situation data is collected for the training of an AI section.

FIG. 2 shows how the situation data for training is obtained when a user operates the robot 10 to perform the series of operations. The situation data is acquired iteratively, at equal or unequal intervals in time. The situation data of each iteration includes the output value of the state sensor and the output value of the operation force detection sensor. The output values of the state sensor are acquired multiple times with small time intervals in one piece of situation data. On the other hand, the output value of the operation force detection sensor is acquired once per one piece of situation data.

The situation data is acquired repeatedly as described above in the course of performing the series of operations and is sequentially input to the AI section 40. The situation data changes in various ways in the process of the user operating the robot 10 and performing the series of operations.

Figure 3:
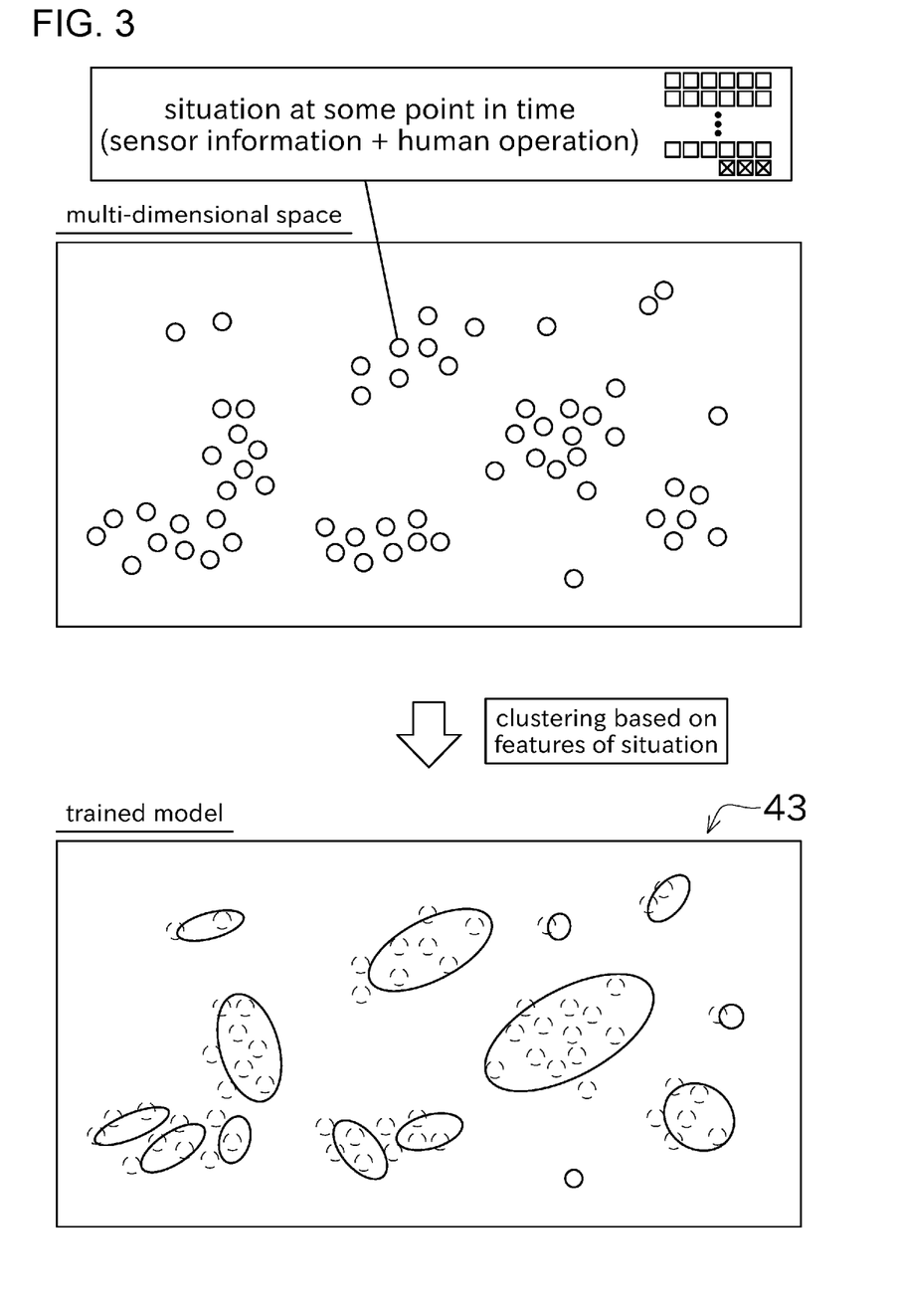
FIG. 3 is a diagram illustrating the building of a trained model.

It is preferable for the user to repeatedly operate the operation unit 21 to have the robot 10 perform the same series of operations repeatedly. The AI section 40 plots feature vectors corresponding to the situation data obtained one after another in the multi-dimensional space of the trained model 43.

After all the situation data to be trained have been input to the AI section 40, clustering is performed on the feature vectors (situation data) plotted in the multi-dimensional space of the trained model 43. Clustering is a method of acquiring a plurality of clusters, each of which is a group of data having similar characteristics to each other. This method is based on learning a rule of distribution from a plurality of data. As a clustering method, known non-hierarchical clustering methods can be used as appropriate. As a result, a plurality of clusters, each of which is a collection of mutually similar situations, are obtained. The number of clusters in the clustering can be determined as appropriate.

Figure 4:
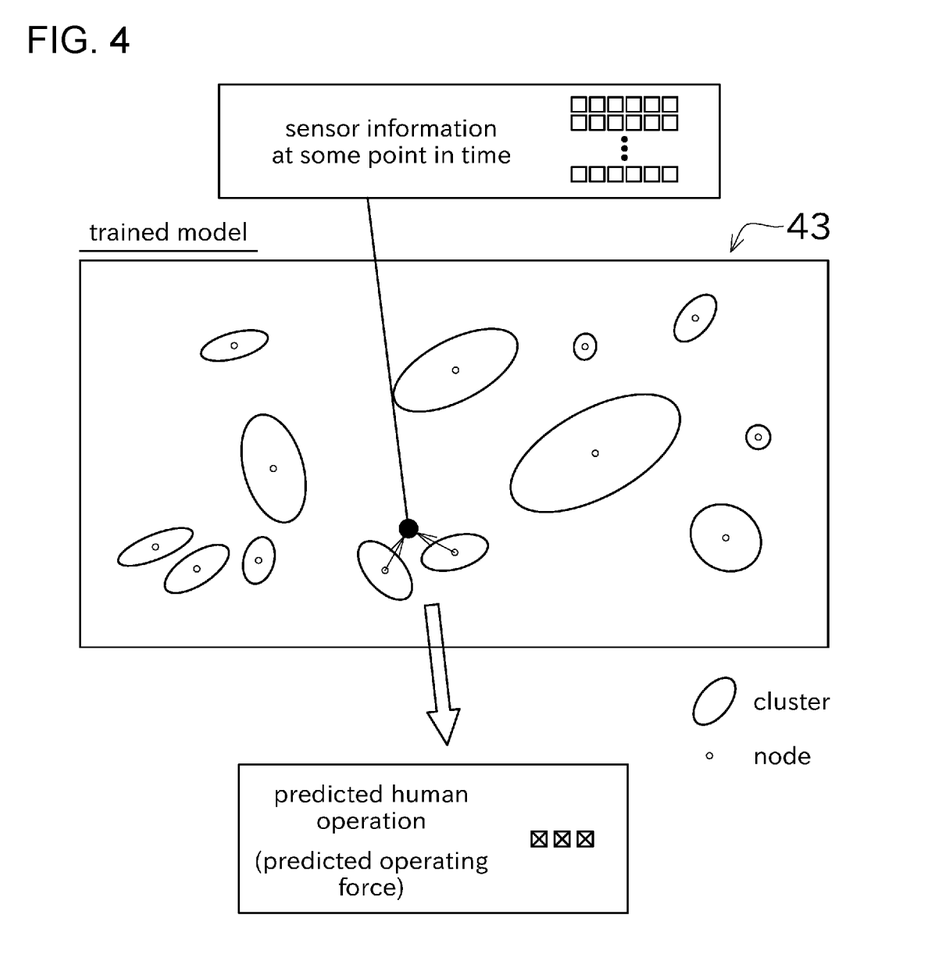
FIG. 4 is a diagram illustrating the inference performed by the trained model.

As a result of the clustering, the trained model 43 built by the AI section 40 is obtained as a distribution of a plurality of clusters in a multi-dimensional space, as shown schematically in FIG. 4. The clusters correspond to characteristic situations that the robot 10 goes through in performing the series of operations.

In the trained model 43, the chronological order of each cluster is obtained. The series of operations of the robot 10 can be represented as a chronological order of the situation data. Therefore, the chronological order of each cluster can be obtained using the information of this order.

The AI section 40 then computationally obtains, in each cluster, the situation data which is representative of the cluster. Hereinafter, this representative situation data may be referred to as a node. The node can be obtained in various ways. For example, it can be the situation data corresponding to the center of gravity of the respective cluster.

Next, the predicted output from the AI section 40 will be described.

In the inference phase, the sensor information at some point in time is input to the trained model 43. When the sensor information is provided to the AI section 40, the trained model 43 finds one or more nodes that have features similar to the sensor information. The sensor information does not include the detected value of the operation force detection sensor. Therefore, the dimensions relating to the detected values of the operation force detection sensor are ignored when calculating the similarity between the sensor information and the node. The similarity can be calculated by a known formula (e.g., Euclidean distance).

When a node having features similar to the sensor information is obtained, the trained model 43 obtains the user operating force (in other words, the detected value of the operation force detection sensor) included in the situation data of the node. If a plurality of nodes similar to the sensor information are detected, the user operating forces of the plurality of nodes are synthesized accordingly. The trained model 43 outputs the obtained user operating force as the predicted operating force described above. By using this predicted operating force, the autonomous operation of the robot 10 can be realized.

In this predicted output, the AI section 40 can output a degree of progress based on the information of the chronological order of the clusters. The degree of progress indicates to which degree of progress among the series of operations the user operating force to be output corresponds. In this embodiment, the degree of progress takes a value in a range from 0 to 100. The closer the value is to 100, the closer the series of operations is to completion. The value of the degree of progress can be predetermined to increase incrementally and cumulatively according to the order of the operations indicated by each cluster.

Next, base trained models 44 will be described in detail.

In the AI section 40 of the present embodiment, the base trained models 44, each of which is different from the trained model 43 described above, are separately built. The base trained models 44 are a plurality of models corresponding to each of the representative basic operations (e.g., the pull-out operation, the conveyance operation, the insertion operation, etc.) included in the trained model 43.

Each of the base trained models 44 is configured as a map of a multi-dimensional space in exactly the same format as the trained model 43. The only difference between the base trained model 44 and the trained model 43 is the data to be trained.

Regarding the base trained model 44, the operation unit 21 is operated so as to cause the robot 10 to perform a simpler operation than in the case of the trained model 43. The training takes place base on this operation. The base trained model 44 is built for each operation. The base trained model 44 for the pull-out operation is trained only the pull-out operation. The base trained model 44 for the conveyance operation is trained only the conveyance operation. The base trained model 44 for the insertion operation is trained only the insertion operation.

For example, considering the base trained model 44 of the pull-out operation, in the training phase, the user operates the operation unit 21 to make the robot 10 perform the pull-out operation. The situation data acquired at this time is input to the AI section 40. The AI section 40 plots the feature vectors corresponding to the situation data obtained one after another in the multi-dimensional space of the base trained model 44. Thereafter, clustering is performed on the situation data plotted in the multi-dimensional space of the base trained model 44. As a result, the base trained model 44 is obtained as a distribution of a plurality of clusters in the multi-dimensional space, as shown schematically in the lower left of FIG. 5.

The human operating the operation unit 21 in the training phase of each base trained model 44 and the human operating the operation unit 21 in the training phase of the trained model 43 may be different. The building of each base trained model 44 may be performed on a different computer than the computer on which the trained model 43 is built.

The operation label storage section 50 stores information identifying the operation trained by the base trained model 44 in relation with the base trained model 44. The information identifying the operation is typically a text string that indicates the name of the operation. For example, it is conceivable to name the base trained model 44 of the pull-out operation "pull-out". The name is set accordingly when the base trained model 44 is built. Hereafter, the name may be referred to as an operation label.

The base trained model combination information acquisition section 60 obtains the combination information when the trained model 43 is represented by a combination of a plurality of the base trained models 44.

To explain specifically, the base trained model combination information acquisition section 60 first compares each of the plurality of the base trained models 44 with the trained model 43 to determine whether the base trained model 44 is similar to a part of the trained model 43. This determination can be based on whether the shape/position of each of the clusters in the multi-dimensional space is similar. For example, one cluster of the base trained model 44 is focused on, the cluster of the trained model 43 having the center of gravity closest to the center of gravity of the cluster is determined. The distance between the centers of gravity of the two clusters is determined. The above process is performed for all clusters of the base trained model 44. If the average value of the distance between the cluster centers of gravity is smaller than a predetermined value, it can be determined that the distribution of the clusters is similar.

The base trained model combination information acquisition section 60 obtains the combination information based on the above determination results. The combination information is information about what combination of the base trained models 44 the trained model 43 can be represented by.

Figure 5:
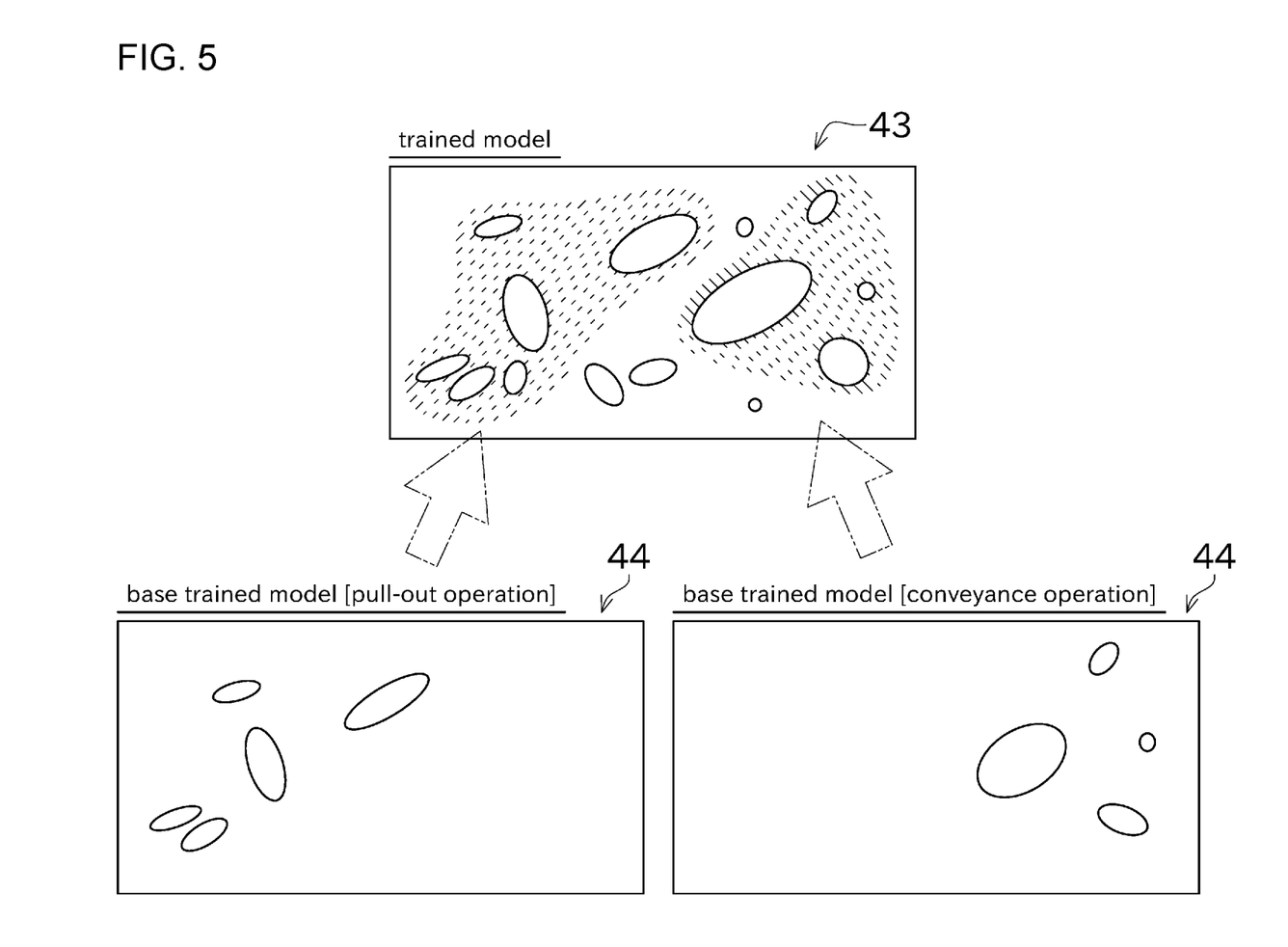
FIG. 5 is a diagram illustrating the process of comparing a trained model with a base trained model.

For example, in the example of FIG. 5, suppose that a portion of the distribution of clusters in the multi-dimensional space of the trained model 43 is similar to the distribution of clusters of the base trained model 44 of the pull-out operation, and the remaining portion is similar to the distribution of clusters of the base trained model 44 of the conveyance operation. In this case, there is room for the trained model 43 to be represented by a combination of the base trained model 44 of the pull-out operation and the base trained model 44 of the conveyance operation. In this way, by comparison with the base trained model 44, the operations trained by the trained model 43 are understood in a decomposed manner.

The situation data when the trained model 43 and the each of base trained models 44 are built are all normalized in a known manner. This makes it easy to compare the trained model 43 with the base trained model 44.

As described above, in the trained model 43, the chronological order of each cluster is obtained. Therefore, by applying the correspondence between the clusters of the trained model 43 and the clusters in the respective base trained models 44 to the information of the chronological order, the relationships that indicate chronologically earlier or later of the base trained models 44 for the combination can be obtained. This means that the combination information considering the chronological order of the operations of the robot 10 can be obtained. The chronological earlier/later relationship may be expressed using the degree of progress described above.

Figure 6:
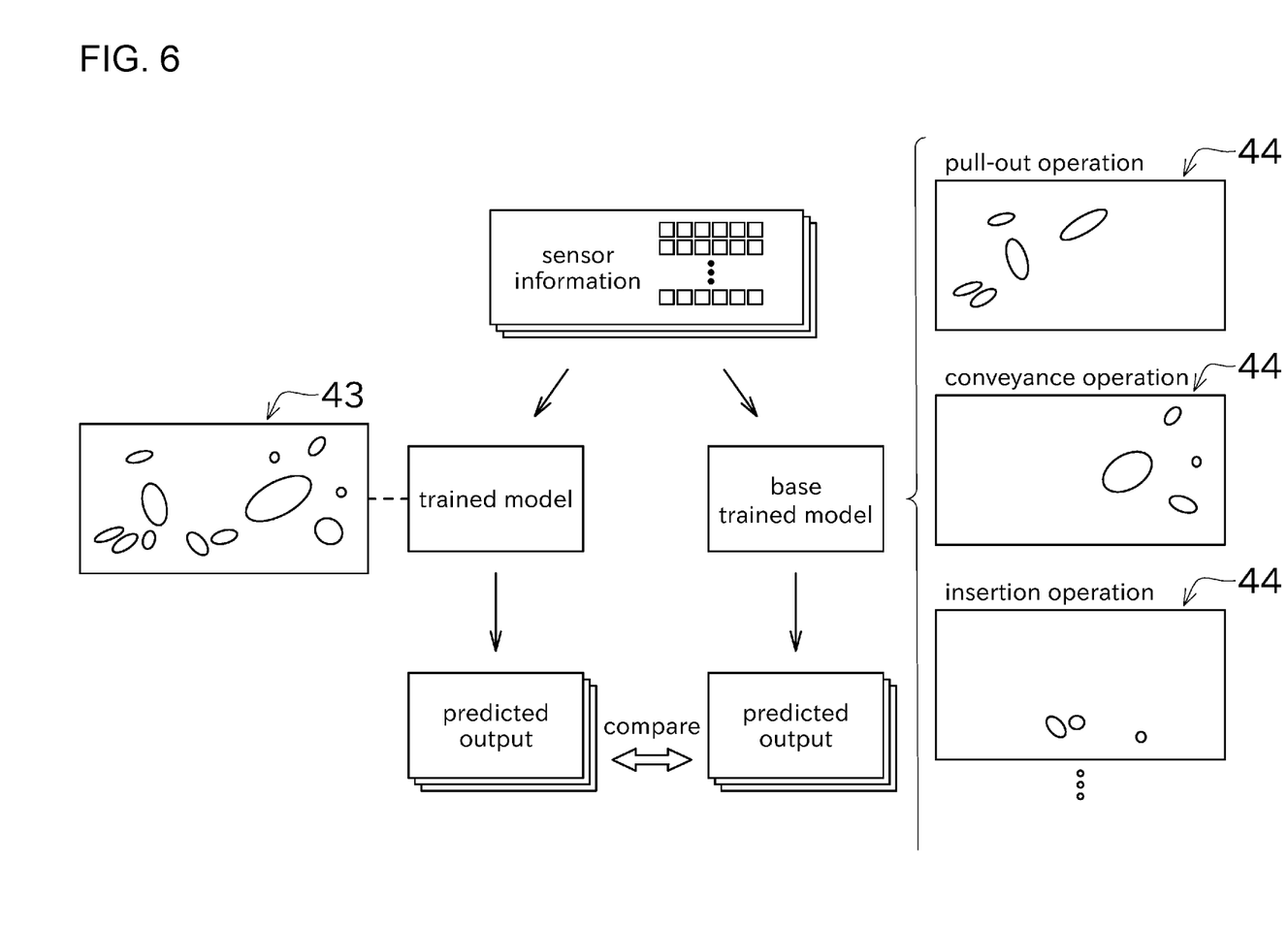
FIG. 6 is a diagram illustrating another method of comparing the trained model with the base trained model.

The comparison of models for obtaining the combination information may also be performed as follows. That is, when the trained model 43 makes the robot 10 perform the series of operations, the sensor information in a time series is acquired using the state detection sensors 11-13. As shown in FIG. 6, the base trained model combination information acquisition section 60 inputs this sensor information to the trained model 43 and the respective base trained model 44. The trained model 43 and the base trained model 44 output a series of predicted operating forces, respectively. The base trained model combination information acquisition section 60 determines whether there is a time-series interval in which the trained model 43 and the base trained model 44 are similar by comparing these predicted outputs with each other. As a result of the above, the combination information which takes into account the chronological order of the operations of the robot 10 is obtained.

In the case of inputting the sensor information in the above-described time series, the cluster used by each of the trained model 43 and the base trained model 44 in outputting the predicted operating force (hereinafter referred to as the "used cluster") may be obtained, and a determination may be made as to whether or not the used clusters are similar to each other. The used cluster means the cluster to which the node close to the input sensor information belongs in the inference phase described in FIG. 4. This allows the models to be compared more appropriately.

After obtaining the combination information, the robot control device 15 can display the operation label corresponding to each of the base trained models 44 representing the trained model 43 on the display unit 22 of the user interface section 20.

As described above, the base trained model combination information acquisition section 60 acquires the combination information considering the chronological order of the operations of the robot 10. Using this information, as shown in the upper part of FIG. 7, the robot control device 15 can display on the display unit 22 the operation labels in a row, for example, from top to bottom in the operation order of the robot 10. By looking at this display, the user can easily understand what combination of operations the trained model 43 has trained (including the chronological order of the operations).

Figure 7:
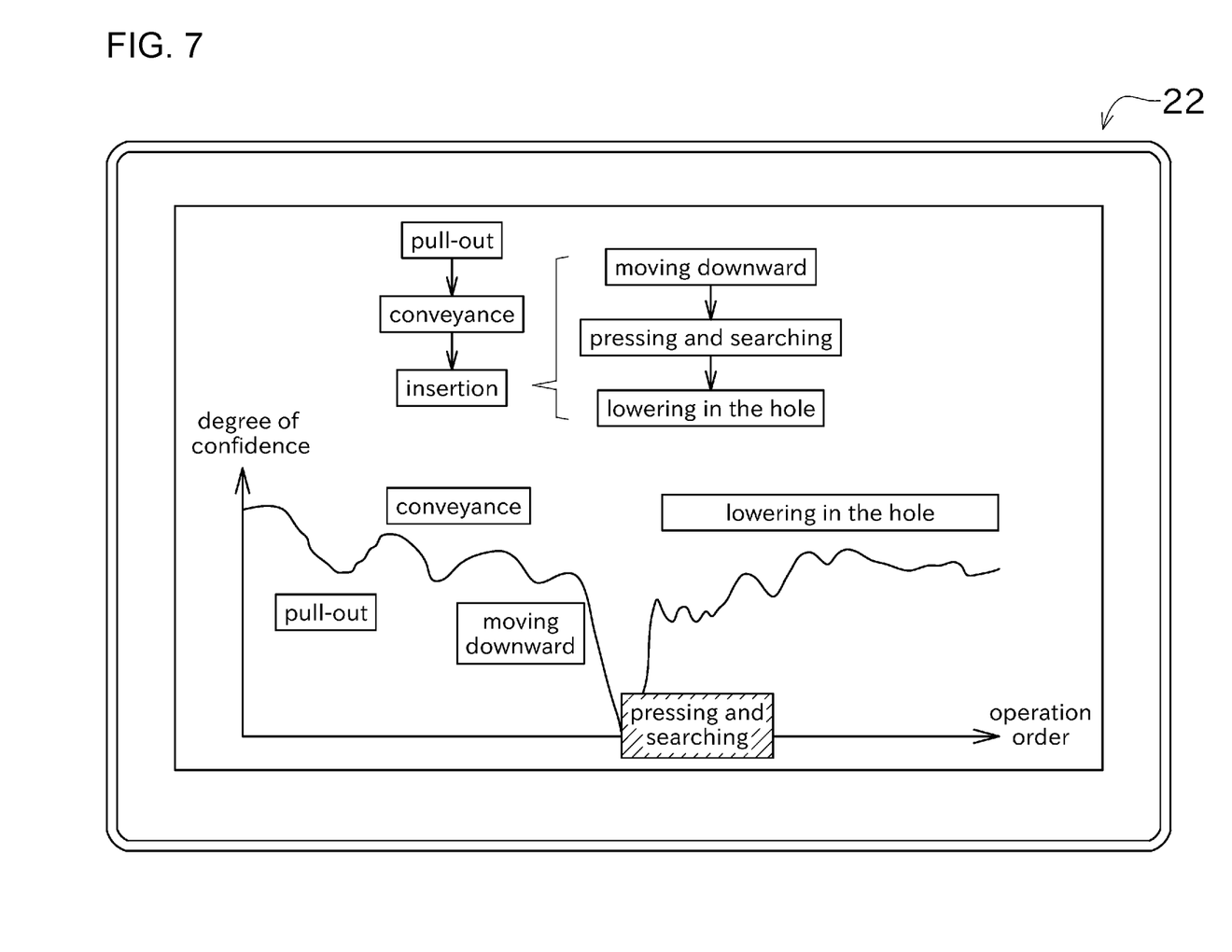
FIG. 7 is a diagram illustrating an example of a display by a display unit in a robot control device.

In the present embodiment, as shown in the upper part of FIG. 7, a downward arrow is displayed to connect each operation label to achieve a display that looks like a workflow diagram. This allows the user to intuitively understand the order of the operations.

In some cases, the operation represented by the base trained model 44 can be decomposed as a combination of further detailed operations. This decomposition can be achieved by having the data input section 41 equipped with a trained model (sub base trained model) built by learning detailed operations described above. For example, suppose that the operation trained by the base trained model 44 of "insertion" can be further decomposed into the operation of "moving downward", the operation of "pressing and searching", and the operation of "lowering in the hole", according to the detailed operations described in (1) to (3) above. In this case, as shown in the upper part of FIG. 7 and the like, the robot control device 15 can display the operation labels of the sub base trained model corresponding to such operations on the display unit 22. This allows the user to understand the operations trained by the trained model 43 by decomposing it hierarchically.

Next, the degree of confidence will be described. The degree of confidence is a parameter used to evaluate whether the operation of the robot 10 is certain (in other words, whether the output predicted by the trained model 43 is certain).

The trained model 43 of the AI section 40 has trained in advance the correspondence between the state of the robot 10 and its surroundings and the user operating force due to the user operation performed at that time. In other words, the trained model 43 operates based on the rules acquired from a large number of known states. Due to the generalization capability inherent in a machine learning model, it is expected that the trained model 43 will output an appropriate predicted operating force even for unknown situations. However, just as a human being is unlikely to act with confidence when placed in a completely new situation which is difficult to predict based on past experience, from the standpoint of the trained model 43, the farther the situation is from the previously trained known situation, the more difficult it is to have confidence in the predicted result. In this sense, the degree of confidence indicates the certainty of the prediction.

In this embodiment, in the inference phase of the trained model 43, the sensor information is input to the trained model 43. If this sensor information is similar to any of the nodes of the plurality of clusters, the prediction is considered to be certain because the state in question is similar to a state experienced in the past. Based on this idea, the confidence can be calculated by finding the node which is most similar to the sensor information input to the trained model 43 and using the similarity of the sensor information to that node.

As shown in the lower part of FIG. 7, the robot control device 15 can display on the display unit 22 the relationship between the operation of the robot 10 and the degree of confidence. In the example of FIG. 7, a graph is displayed on the display unit 22. In this graph, the horizontal axis is the order of operations and the vertical axis is the degree of confidence.

The user can easily check the operation that is insufficiently trained (in other words, the operation that should be corrected with a low degree of confidence) by focusing on the degree of confidence of each operation in the workflow.

The robot control device 15 may display the operation label indicating the operation for which the degree of confidence is greater than or equal to the predetermined value, and the operation label indicating the operation for which the degree of confidence is less than the predetermined value, in different display manner. For example, the operation label having a low degree of confidence may be displayed in a different color or marked to emphasize it more conspicuously than others.

In the lower graph of FIG. 7, the fact that there is insufficient confidence in the operation of "pressing and searching" is indicated by displaying the operation label in a different color than usual. For the circumstances of the drawing, the color difference is represented by hatching. This makes it even easier for the user to confirm the operation for which learning is insufficient.

The operation label corresponding to the acquired degree of confidence can be acquired in the following manner. When acquiring the degree of confidence, the sensor information in the time series is input to the trained model 43. The robot control device 15 also inputs the sensor information in the time series to the base trained model 44 pertaining to the operation that decomposed the operation of the trained model 43, respectively. Each of the trained model 43 and the base trained model 44 outputs predicted operating force. The robot control device 15 identifies a time-series interval in which the series of predicted outputs are similar to each other. Based on this correspondence, the interval of the degree of confidence corresponding to one operation label (in other words, the chronological position of the operation) can be determined.

In the present embodiment, by the user selecting the operation label displayed on the display unit 22 and performing a predetermined operation, the operation corresponding to the selected operation label can be deleted from what has been trained by the trained model 43. Selecting an operation label is substantially the same as indicating a chronological position of the operation. Deleting the training can be accomplished by deleting the part of the clusters formed in the trained model 43 that correspond to the clusters in the base trained model 44 corresponding to the selected operation labels.

After deleting the operation with a low degree of confidence, the user can use the new situation data (additional situation data as additional work data) to correct the operations that have not been trained sufficiently. This is equivalent to replacing the part of what the trained model 43 has trained, which corresponds to some of the operations. In this way, the user can perform the correction work by specifying the corresponding position of the workflow in the trained model 43 by paying attention to the operation labels displayed on the display unit 22. Therefore, the correction work can be performed efficiently with a sense similar to editing a film image.

It is sufficient that the situation data used for the correction includes data related to the operation to be corrected, which may correspond to a part of the series of operations. Thus, the time and effort required to collect data for relearning can be greatly reduced.

As described above, the robot control device 15 of the present embodiment can edit what the trained model 43 has been trained, in units of operation labels. As a result, an intuitive and easy-to-understand operation is possible.

By the way, in order to confirm the output of the trained model 43 which is built, a series of situation data for evaluation may be input to the AI section 40. In this case, the robot control device 15 may display on the display unit 22 the progress corresponding to the operation estimated from the current situation data, and also display the operation label corresponding to the operation in a display manner different from others. According to this, if the trained model 43 is insufficiently trained, the user can easily understand in which part of the operation the problem occurs by looking at the display unit 22.

In the present embodiment, the user can operate the robot 10 in real-time to generate situation data, build the trained model 43, and display on the display unit 22 a combination of the operations of the robot 10 based on the trained model 43 which is built. Accordingly, the user can check whether the combination of the operations represented by the trained model 43 is as intended by the user while the user still has a sense of operation when operating the robot 10. Accordingly, the user can easily understand on the spot what kind of operation has been trained. In addition, while the sensation of operating the robot 10 is fresh, the user can take advantage of the sensation to flexibly perform the modification of the trained model 43 as necessary.

Next, a degree of concordance, which is a parameter that is useful when causing the trained model 43 to perform additional learning, will be described.

The degree of concordance is a parameter for evaluating the degree of concordance between the output data output by the trained model 43 and the output data included in the untrained situation data, when the untrained situation data is input to the trained model 43. This degree of concordance is obtained by the data comparison section 70 included by the robot control device 15 by performing a comparison process.

The robot control device 15 can display the degree of concordance on the display unit 22 in relation to the time series of the operation of the robot 10. For example, a graph may be displayed on the display unit 22. In this graph, the horizontal axis is the operation order and the vertical axis is the value of the degree of concordance. By looking at the degree of concordance which is displayed, the user can easily understand which operations of the trained model 43 are consistent with the untrained situation data and which operations are not consistent. Thus, it is convenient for the user to predict in advance whether it is appropriate, for example, that the trained model 43 is additionally trained on the additional situation data described above.

As described above, the robot control device 15 of the present embodiment includes the trained model 43, the operation switching section 30, the base trained models 44, the operation label storage section 50, the base trained model combination information acquisition section 60, and the display unit 22. The trained model 43 is built by being trained on work data when a human operates the robot 10 so that the robot 10 performs the series of operations. The work data includes input data and output data. The input data is the state of the robot 10 and its surroundings. The output data is the corresponding human operation. The operation switching section 30 acquires control data of the robot 10 to make the robot 10 perform the work. For this acquisition, in the case the input data concerning the state of the robot 10 and its surroundings is input to the trained model 43, output data concerning the human operation predicted accordingly is acquired from the trained model 43. Each of the base trained models 44 is built by being trained on work data when a human operates the robot 10 so that the robot 10 performs the operation simpler than the series of operations. Each of the base trained models 44 is built for each of the plurality of the operations. The work data includes input data and output data. The input data is the state of the robot 10 and its surroundings. The output data is the corresponding human operation or the operation of the robot 10 by the human operation is output data. The operation label storage section 50 stores the operation labels. Each of the operation labels includes information expressing the operation and is stored corresponding to the base trained model 44. The base trained model combination information acquisition section 60 acquires the combination information when the trained model 43 is represented by a combination of a plurality of the base trained models 44. The combination information is acquired by acquiring the similarity between the trained model 43 and the respective base trained models 44. The display unit 22 displays the operation label corresponding to each of the plurality of the base trained models 44 which are combined to represent the trained model 43. This display is based on the combination information.

As a result, when the series of operations is trained by the trained model 43, the user can easily understand based on the operation labels which are displayed, what combination of operations the series of operations can be said to have been trained as. Therefore, the transparency of the trained model 43 is increased, and the user can use the trained model 43 for robot control with a sense of satisfaction.

In the robot control device 15 of the present embodiment, the base trained model combination information acquisition section 60 acquires a relationship which indicates chronologically earlier or later of the base trained models 44 when the trained model 43 is represented by a combination of the plurality of the base trained models 44. The display unit 22 displays the chronological relationship of the plurality of the base trained models 44 using the operation labels.

This allows the user to easily understand the relationship of the time order of the operations.

Also, in the robot control device 15 of the present embodiment, when the input data is input to the trained model 43, the trained model 43 outputs the corresponding output data. The trained model 43 is capable of outputting a degree of progress indicating to which degree of progress of the series of operations the output data corresponds. The base trained model combination information acquisition section 60 is capable of acquiring the relationship which indicates chronologically earlier or later of the base trained models 44 based on the degree of progress.

This allows the time order of the operations to be handled in an easily understood manner.

Also, in the robot control device 15 of the present embodiment, the trained model 43 and the base trained models 44 are capable of clustering the work data to be trained according to the features. The base trained model combination information acquisition section 60 determines the similarity between the trained model 43 and the respective base trained model 44 by comparing the result of the clustering in the trained model 43 and the result of the clustering in the base trained model 44.

This allows the trained model 43 to be appropriately compared to the base trained model 44.

Also, the robot control device 15 of the present embodiment includes the data comparison section 70. When the data of the state of the robot 10 and its surroundings which is included in untrained situation data is input to the trained model 43, the data comparison section 70 acquires the degree of concordance by comparing a predicted operating force output by the trained model 43 and a user operating force included in the untrained situation data. The display unit 22 displays the degree of concordance in relation to the time series of the operation of the robot 10.

This allows the user to easily understand which operation of the trained model 43 is consistent with the untrained situation data and which operation is not.

Also, in the robot control device 15 of the present embodiment, the untrained situation data can be situation data which is generated in real-time by a human operating the robot 10 so that the robot performs at least a part of the series of operations.

In this case, the output of the trained model 43 can be checked against the human operation on the spot. Accordingly, the examination work can be performed intuitively, since it can be compared with the operation of the trained model 43 while the sense of the human operation remains.

Also, in the robot control device 15 of the present embodiment, by being specified a chronological position of an operation of the series of the operations, the trained model is capable of deleting a part corresponding to the specified operation in the trained model 43.

This allows the trained model 43 to be flexibly edited for each operation that constitutes a part of the series of operations.

Also, in the robot control device 15 of the present embodiment, when the trained model 43 outputs the output data in response to the input of the input data, the trained model 43 is capable of outputting the degree of confidence that indicates the certainty of the prediction. The display unit 22 displays the degree of confidence along with the operation label.

This allows the user to easily understand whether or not the trained model assumes the state indicated by the input data.

In the present embodiment, the robot is controlled by a robot control method including the following control data acquisition step, an operation label storage step, a base trained model combination information acquisition step, and an information display step. In the control data acquisition step, control data of the robot 10 to make the robot 10 perform the work is acquired. For this acquisition, in the case input data concerning the state of the robot 10 and its surroundings is input to the trained model 43, output data concerning the human operation predicted accordingly is acquired from the trained model 43. In the operation label storage step, operation labels are stored. Each of the operation labels includes information expressing the operation and is stored in correspondence with the base trained model 44. In the base trained model combination information acquisition step, the combination information is acquired when the trained model 43 is represented by a combination of a plurality of the base trained models 44. The combination information is acquired by acquiring a similarity between the trained model 43 and the respective base trained models 44. In the information display step, the operation label corresponding to each of the plurality of the base trained models 44 which are combined to represent the trained model 43 is displayed. This display is based on the combination information.

As a result, when the series of operations is trained by the trained model 43, the user can easily understand based on the operation labels which are displayed, what combination of operations the series of operations can be said to have been trained as. Therefore, the transparency of the trained model 43 is increased, and the user can use the trained model 43 for robot control with a sense of satisfaction.

While the preferred embodiment of the present invention has been described above, the configurations described above may be modified as follows, for example.

Instead of learning the relationship between the sensor information and the user operating force, the trained model 43 may be configured to learn the relationship between the sensor information and the movement command to the robot 10.

The operation label is not limited to a display using shapes such as a workflow diagram but may be displayed in a tabular form, for example. Also, the text strings of the operation labels may be simply displayed in some arrangement.

Instead of being displayed in an order according to chronological information, the operation labels may be displayed in no particular order.

The operation label can be a marker that can identify what the operation is. Instead of being a text string such as "pull-out", the operation label can be an image, such as an icon, for example.

The robot control device 15 may be provided with an audio unit instead of or in addition to the display unit 22 as an information output section. Then, the robot control device 15 may output an operation label via the audio. For example, the robot control device 15 may read out the operation label by a speech synthesis function. Also, the robot control device 15 may read out the degree of confidence and the degree of concordance when reading out the operation label.

Instead of editing what the trained model 43 has trained for each operation label, the time series may be directly specified and edited. For example, it is conceivable to specify a part of the horizontal axis of the graph shown in the lower part of FIG. 7 and delete/modify the operation of the specified part.

The robot control device 15 may modify the operations of the robot 10 based on reinforcement learning.

Sensor other than the motion sensor 11, the force sensor 12, and the camera 13 may be used as a sensor for acquiring the state of the robot 10 and its surroundings (state sensor).

An operation position detection sensor may be provided in the operation unit 21 instead of or in addition to the operation force detection sensor. It can be said that the operation position detection sensor, as with the operation force detection sensor, detects human operation.

It may be a robot system 1 wherein the operation unit 21 is a master arm used for remote operation and the robot 10 is a slave arm. In this case, the AI section 40 can build a trained model 43 and a base trained model 44 that is trained based on the operation of the master arm by the user.

DESCRIPTION OF THE REFERENCE NUMERALS 1 robot system
10 robot
11 motion sensor
12 force sensor
13 camera
15 robot control device
22 display unit (information output section)
30 operation switching section (control data acquisition section)
43 trained model
44 base trained Model
50 operation label storage section
60 base trained model combination information acquisition section
70 data comparison section (comparison section)

The invention claimed is:

1. A robot control device comprising:
  a trained model which is built by being trained on work data when a human operates a robot so that the robot performs a series of operations, the work data including input data and output data, the input data being the state of the robot and its surroundings, the output data being the corresponding human operation or the operation of the robot by the human operation;
  a control data acquisition section which acquires control data of the robot to make the robot perform the work, in the case the input data concerning the state of the robot and its surroundings is input to the trained model, by acquiring output data concerning the human operation or the operation of the robot predicted accordingly from the trained model;
  base trained models, each of the base trained models being built by being trained on work data when a human operates the robot so that the robot performs an operation decomposed from the series of operations, and being built for each of a plurality of operations decomposed from the series of operations, the work data including input data and output data, the input data being the state of the robot and its surroundings, the output data being the corresponding human operation or the operation of the robot by the human operation;
  an operation label storage section which stores operation labels, each of the operation labels including information expressing the operation and being stored in correspondence with the base trained model;
  a base trained model combination information acquisition section which acquires combination information when the trained model is represented by a combination of a plurality of the base trained models, by acquiring a similarity between the trained model and the respective base trained models; and
  an information output section that outputs the operation label corresponding to each of the plurality of the base trained models which are combined to represent the trained model based on the combination information.

2. The robot control device according to claim 1, wherein the base trained model combination information acquisition section acquires a relationship which indicates chronologically earlier or later of the base trained models when the trained model is represented by a combination of the plurality of the base trained models, and
  the information output section outputs the chronological relationship of the plurality of the base trained models using the operation labels.

3. The robot control device according to claim 1, wherein when the input data is input to the trained model, the trained model outputs the corresponding output data and is capable of outputting a degree of progress indicating to which degree of progress of the series of operations the output data corresponds, and the base trained model combination information acquisition section is capable of acquiring the relationship which indicates chronologically earlier or later of the base trained models based on the degree of progress.

4. The robot control device according to claim 1, wherein the trained model and the base trained models are capable of clustering the work data to be trained according to the features, and the base trained model combination information acquisition section determines a similarity between the trained model and the respective base trained model by comparing a result of the clustering in the trained model and a result of the clustering in the base trained model.

5. The robot control device according to claim 1, wherein the base trained model combination information acquisition section determines a similarity between the trained model and the respective base trained model by comparing data output by the trained model and the base trained model for the same input data.

6. The robot control device according to claim 1, comprising:

a comparison section, when the data of the state of the robot and its surroundings which is included in untrained work data is input to the trained model, acquiring a degree of concordance by comparing the output data output by the trained model and the output data included in the untrained work data; wherein the information output section outputs the degree of concordance in relation to a time series of the operation of the robot.

7. The robot control device according to claim 6, wherein the untrained work data is generated in real-time, as the result of operating the robot by a human so that the robot performs at least a part of the series of operations.

8. The robot control device according to claim 1, wherein by being specified a chronological position of an operation among the series of the operations, the trained model is capable of deleting a part corresponding to the specified operation in the trained model.

9. The robot control device according to claim 1, wherein by being specified a chronological position of an operation among the series of the operations and additional work data for training an operation to replace, the trained model is capable of replacing a part corresponding to the specified operation in the trained model with the result of training on the additional work data.

10. The robot control device according to claim 1, wherein when the trained model outputs the output data in response to the input of the input data, the trained model is capable of outputting a degree of confidence that indicates certainty of the prediction, and the information output section outputs the degree of confidence along with the operation label.

11. A robot system comprising:

the robot control device according to claim 1; and the robot.

12. A robot control method using a trained model which is built by being trained on work data when a human operates a robot so that the robot performs a series of operations, the work data including input data and output data, the input data being the state of the robot and its surroundings, the output data being the corresponding human operation or the operation of the robot by the human operation, and using base trained models, each of the base trained models being built by being trained on work data when a human operates the robot so that the robot performs an operation decomposed from the series of operations, and being built for each of a plurality of operations decomposed from the series of operations, the work data including input data and output data, the input data being the state of the robot and its surroundings, the output data being the corresponding human operation or the operation of the robot by the human operation, the method comprising:

a control data acquisition step for acquiring control data of the robot to make the robot perform the work, in the case the input data concerning the state of the robot and its surroundings is input to the trained model, by acquiring output data concerning the human operation or the operation of the robot predicted accordingly from the trained model;

an operation label storage step for storing operation labels, each of the operation labels including information expressing the operation and being stored in correspondence with the base trained model;

a base trained model combination information acquisition step for acquiring combination information when the trained model is represented by a combination of a plurality of the base trained models, by acquiring a similarity between the trained model and the respective base trained models; and an information output step for outputting the operation label corresponding to each of the plurality of the base trained models which are combined to represent the trained model based on the combination information.

\* \* \* \* \*